Figure 1:
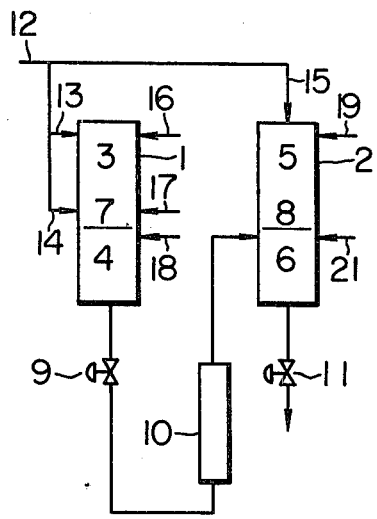

United States Patent [19]

Kita et al.

[11] 4,123,600
[45] Oct. 31, 1978

[54] PROCESS FOR THE HIGH PRESSURE PRODUCTION OF POLYETHYLENE

[75] Inventors: Shinichiro Kita, Niihama; Fumihiko Hiki, Ichihara; Masayuki Shimizu; Akira Kondou, both of Niihama, all of Japan

[73] Assignee: Sumitomo Chemical Company, Limited, Osaka, Japan

[21] Appl. No.: 821,920

[22] Filed: Aug. 4, 1977

[30] Foreign Application Priority Data

Aug. 13, 1976 [JP] Japan .................................. 51-97162

[51] Int. Cl.² .......................... C08F 4/04; C08F 4/34; C08F 10/02
[52] U.S. Cl. ...................................... 526/65; 526/73; 526/352.2
[58] Field of Search .................. 526/65, 73, 352, 352.2

[56] References Cited

U.S. PATENT DOCUMENTS

| | | | |
|---|---|---|---|
| 3,178,404 | 4/1965 | Vaughn, Jr. et al. | 526/73 |
| 3,536,693 | 10/1970 | Schrader et al. | 526/73 |
| 3,575,950 | 4/1971 | Gleason et al. | 526/73 |
| 3,756,996 | 9/1973 | Pugh et al. | 526/73 |
| 3,875,128 | 4/1975 | Suzuki et al. | 526/73 |
| 4,014,859 | 3/1977 | Cooper et al. | 526/65 |

FOREIGN PATENT DOCUMENTS

| | | |
|---|---|---|
| 20,243 | 10/1961 | Japan. |
| 14,258 | 4/1971 | Japan. |
| 1,208,120 | 10/1970 | United Kingdom. |

*Primary Examiner*—Alan Holler
*Attorney, Agent, or Firm*—Stevens, Davis, Miller & Mosher

[57] ABSTRACT

A process for polymerizing ethylene under the high temperature and high pressure conditions by using a battery of two or more autoclave reactors connected in series by means of piping provided with a heat exchanger, each of said reactors having an upper reaction zone and a lower reaction zone. According to this process, the reaction yield of polyethylene is higher than that attainable from the conventional two-zone polymerization methods, and the obtained polyethylene is improved in optical properties and processability.

7 Claims, 4 Drawing Figures

PROCESS FOR THE HIGH PRESSURE PRODUCTION OF POLYETHYLENE

This invention relates to an improved process for producing low-density polyethylene, and more particularly it relates to an improved high-pressure polymerization method for production of ethylene by use of a battery of two or more autoclave reactors, each of which has an upper reaction zone and a lower reaction zone.

Polyethylene is produced industrially by a variety of processes, and there are commercially available many types of polyethylene having their own peculiar properties. These different types of polyethylene are usually classified, by way of polymer density, into low-density polyethylene, medium-density polyethylene and high-density polyethylene. Among them, the low-density polyethylene, having a density within the range of 0.900 to 0.935 g/cm$^3$, is widely used as a film material for wrapping and packaging.

The low-density polyethylene used for these purposes is essentially required to have excellent optical properties, stiffness and processability. For production of low-density polyethylene having such properties by use of autoclave reactors, there is known so-called two-reaction zone processes in which polymerization is carried out in the first reaction zone and the second reaction zone at different reaction temperatures, and such processes are disclosed, for example, in U.S. Pat. Nos. 3,536,693 and 3,875,128, and British Pat. No. 1,208,120.

However, a two-zone polymerization process, when practiced according to the method of U.S. Pat. No. 3,875,128 encounters the following problems.

It is well known that the reaction yield (percent of the produced polymer weight per unit weight of feed gas supplied into the reactor) of polyethylene is determined by the following heat balance in the reactor:

| Quantity of generated polymerization heat (Polymerization heat × reaction yield × ethylene feed rate) | = | (Ethylene feed rate × difference of sensible heat × specific heat) + quantity of heat removal from the outside |
|---|---|---| in the case of reactions on an industrial scale. Thus, the reaction yield is increased proportionally to both the difference of sensible heat and heat removal from the outside.

Also, in the above two-zone polymerization process, high-pressure polymerization of ethylene is practiced in the first reaction zone and the second reaction zone at different reaction temperatures so as to produce polyethylene with excellent optical properties and processability, and usually the reaction temperature used in the first reaction zone is as low as 140° to 200° C.

Therefore, according to the method of U.S. Pat. No. 3,875,128, the difference of sensible heat is determinable if the ethylene feeding temperature at the inlet of the reactor and the discharging temperature of the reaction mixture at the outlet of the reactor are known, but as regards the heat removal from the outside, the quantity of such heat removal is proportional to the difference between the reaction temperature in the autoclave reactor at the preceding stage and the temperature after lowering by the heat exchanger which is set posterior to the preceding autoclave reactor, so that when the said two-zone polymerization process is practiced according to the method of said U.S. Pat. No. 3,875,128, it proves that the heat removal from the outside is very slight, because of the facts that the reaction temperature in the autoclave reactor of the preceding stage is generally low, as noted above, and that the temperature of the reaction mixture cooled by the heat exchanger can not be reduced below 120° C. Accordingly the increase, if any, of the resultant reaction yield of polyethylene is limited.

Figure 2:
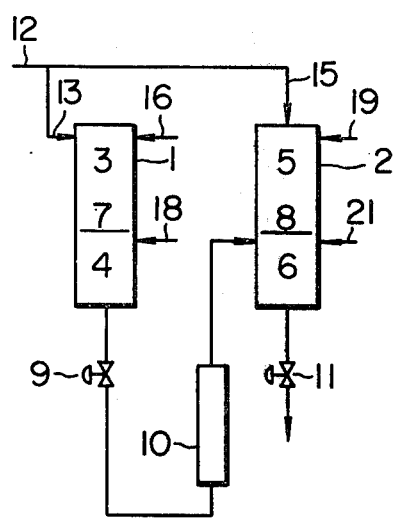
Figure 3:
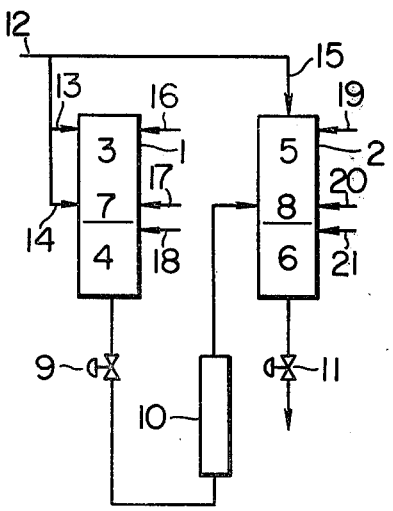
Figure 4:
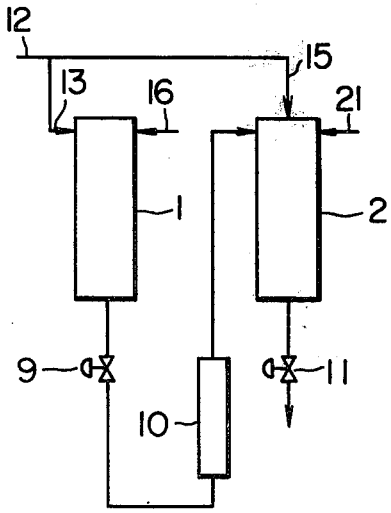

In the accompanying drawings,

FIGS. 1, 2 and 3 are schematic diagrams of the preferred forms of reactors used in practicing the method of this invention, and FIG. 4 is a schematic diagram of a conventional reactor system shown for comparison. In these drawings, like reference numerals are used to indicate like parts or like lines throughout and the following notation is employed therein:

- 1, 2: autoclave reactors
- 3, 5: upper reaction zones
- 4, 6: lower reaction zones
- 7, 8: baffles
- 9, 11: pressure regulator valves
- 10: heat exchanger
- 12, 13, 14, 15: piping (for feeding ethylene)
- 16, 17, 18, 19, 20, 21: piping (for feeding polymerization initiator)

An object of this invention, therefore, is to provide an improved method for production of polyethylene, which method is improved over the two-zone polymerization process of low-density polyethylene according to the method of U.S. Pat. No. 3,875,128, and is capable of further increasing the reaction yield of polyethylene.

Another object of this invention is to provide a process for producing polyethylene which has better optical properties and processability than the polyethylene obtained from the conventional two-reaction-zone polymerization process.

The other objects and advantages of this invention will become apparent from a consideration of the following detailed description of the invention.

According to the present invention, there is provided a process for polymerizing ethylene under high temperature and high pressure conditions by using a battery of two or more autoclave reactors connected in series by piping provided with a heat exchanger, in which the reaction mixture withdrawn from the autoclave reactor of the preceding stage is cooled by said heat exchanger and the cooled reaction mixture is further introduced into the succeeding autoclave reactor, which process is characterized by supplying a substantial portion of feed ethylene into the upper reaction zone of the preceding autoclave reactor having an upper reaction zone and a lower reaction zone, while supplying the remaining portion of said feed ethylene into the upper reaction zone of the succeeding autoclave reactor having an upper reaction zone and a lower reaction zone, polymerizing the ethylene in the upper reaction zone of said preceding autoclave reactor under a pressure of 1,000 to 2,800 kg/cm$^2$ and at a temperature of 130° to 200° C. in the presence of a polymerization initiator, introducing the thus obtained reaction mixture into the lower reaction zone of said preceding autoclave reactor and polymerizing said mixture therein at a temperature of 220° to 280° C. in the presence of a polymerization initiator, cooling the reaction mixture withdrawn from the bottom end of said preceeding reactor to a temperature higher than 120° C. but lower than the reaction temperature in the lower reaction zone of said preceding reactor by 20° C. or more by the heat exchanger provided between said preceding and succeeding reactors, then forwarding the cooled reaction mixture into the upper or lower reaction zone of said succeeding reactor and polymerizing said mixture therein under a pressure of 1,000 to 2,800 kg/cm² and at a temperature of 130° to 200° C. in the presence of a polymerization initiator, introducing the thus obtained reaction mixture into the lower reaction zone of said succeeding reactor and further polymerizing said mixture therein at a temperature of 220° to 280° C. in the presence of a polymerization initiator.

Thus, according to the method of this invention, the reaction temperature in the lower reaction zone of the preceding autoclave reactor can be elevated far higher than the reaction temperature in the first autoclave reactor used in the two-reaction-zone polymerization process according to the method of U.S. Pat. No. 3,875,128 so that the temperature difference created by cooling of the reaction mixture by the heat exchanger is necessarily enlarged, thus allowing increased heat removal from the outside and enhancement of the reaction yield of polyethylene.

Such improvement of the reaction yield provided by the method of this invention is of extremely high commercial value.

In practicing the present invention, there are used autoclave reactors having a substantially cylindrical or nearly cylindrical form and having a length to diameter ratio of from 2 to 20, and preferably from 5 to 15.

Now, the process of this invention is described in further detail.

Each of the autoclave reactors used in this invention is partitioned into two zones (upper reaction zone and lower reaction zone) by a baffle (partition plate) or other partition means, and ethylene is polymerized in these two zones at different reaction temperatures.

In practicing the process of this invention, the volume ratio of the upper to lower reaction zone of the first- or second-stage autoclave reactor may not necessarily be 1 (that is, the upper and lower reaction zones need not be equal in capacity).

The above volume ratio can be made greater than 1 based on the fact that the working efficiency of the polymerization initiator (the number of moles of ethylene polymerized per mole of polymerization initiator) in the upper reaction zone is improved substantially proportionally to the average residence time when such average residence time of the gas in the upper reaction zone is increased relative to the given charge of feed ethylene into the reactor. However, there is naturally an upper limit to said volume ratio, and it is practically impossible to elevate such volume ratio higher than 6 for the following reason. Generally, polymerization of ethylene generates heat to about 800 cal/g, and in the polymerization process using an autoclave reactor or reactors, removal of such polymerization heat is effected by means of the difference in sensible heat between the reaction mixture withdrawn from the reactor and the cold ethylene supplied as starting material, so that if the volume ratio of the upper to lower reaction zone is increased too much while maintaining the feed of ethylene constant, the quantity of ethylene polymerization heat generated within the average residence time becomes smaller than the heat quantity required for raising the temperature of ethylene introduced into the lower reaction zone (more accurately, the 130° to 200° C. reaction mixture reacted in the upper reaction zone) to the desired level in the lower reaction zone, making it impossible to raise the temperature to the desired level in the lower reaction zone.

As is apparent from the foregoing discussion, the upper limit of said volume ratio can vary as it is a function of the reaction temperature in the lower reaction zone, the type of polymerization initiator used, the capacity of the reactor used, and the ethylene feed rate, but when we consider the feed rate of ethylene and capacity of the autoclave reactors generally used in the current polyethylene production processes, the upper limit of said volume ratio is safely given at 6.

The volume ratio of the upper to lower reaction zone may be different for the preceding autoclave reactor and the succeeding autoclave reactor.

According to the process of this invention, it is possible to obtain polyethylene having improved excellent optical properties and processability than those obtainable from the conventional methods if the feed inlets of ethylene and polymerization initiator into the upper reaction zone of the preceding and/or succeeding autoclave reactor provided are two or more (preferably two to ten, but most preferably two) in number along the length of the reactor. The polymerization initiator may be supplied either from the same inlets as the ethylene or from different inlets.

Various combinations of the positions of inlets of feed ethylene and polymerization initiator into the upper reaction zone are possible, but it is essential for accomplishing the said object to make a selection that allows as uniform a reaction temperature distribution as possible in the upper reaction zone. Such positional selection is easy to determine for those skilled in the art.

In the present invention, a "substantial portion" of feed ethylene is supplied into the upper reaction zone of the preceding autoclave reactor. The term "substantial portion" used herein means a quantity which is more than 60% of the total feed of ethylnee.

If the feed of ethylene into the upper reaction zone of the preceding reactor is less than 60% of the total amount of ethylene supplied, the obtained polyethylene quality is degraded.

In the present invention, it is desirable for obtaining high-quality polyethylene to use the reaction pressures and temperatures within the below-defined ranges.

As for ethylene reaction pressure, it should be selected from within the range of 1,000 to 2,800 kg/cm², preferably 1,100 to 2,500 kg/cm².

In the present invention, the amount of pressure provided, after deducting the pressure loss occuring in the piping, to the succeeding reactor from the reaction pressure in the preceding reactor is the maximum amount pressure provided in the succeeding reactor. Therefore, reaction pressure in the succeeding reactor may be suitably adjusted within said range by a pressure regulating valve provided at the outlet of the preceding reactor.

The preferred range of reaction temperature used in this invention is from 130° to 200° C., preferably 140° to 190° C., for the upper reaction zone, and from 220° to 280° C., preferably 230° to 270° C., for the lower reaction zone, in both the preceding and succeeding reactors, respectively.

The reaction temperature in the upper reaction zone may be different between the preceding reactor and the succeeding reactor. The same holds true with respect to the lower reaction zone.

The reaction mixture discharged from the bottom end of the lower reaction zone of the preceding autoclave reactor is cooled to a temperature higher than 120° C. but lower than the reaction temperature in the lower reaction zone of the preceding reactor by 20° C. or more by means of a heat exchanger set between the preceding reactor and the succeeding reactor, and the cooled mixture is introduced into the upper or lower reaction zone of the succeeding reactor.

The polymerization initiator used in the upper reaction zones of both preceding and succeeding autoclave reactors is preferably one which is decomposed at a temperature of 40° to 80° C. with half-life period of 10 hours, and examples of such initiators include the following: diisopropyl peroxydicarbonate, di-2-ethylhexyl peroxydicarbonate, tert-butyl peroxypivalate, 3,5,5-trimethylhexanoyl peroxide, octanoyl peroxide, decanoyl peroxide, lauroyl peroxide, propionyl peroxide, tert-butyl peroxy-2-ethylhexanoate, tert-butyl peroxyisobutyrate and the like.

The amount of polymerization initiator to be used for the polymerization of ethylene in the upper reaction zones of said both autoclave reactors is generally 50 to 1,000 parts by weight per 1,000,000 parts by weight of ethylene.

The polymerization initiator used in the lower reaction zones of both said autoclave reactors is desirably one which is decomposed at 70° to 140° C. to obtain the half-life period of 10 hours, and the examples of such initiator includes, tert-butyl peroxy-2-ethylhexanoate, tert-butyl peroxyisobutyrate, tert-butyl peroxylaurate, tert-butyl peroxyisopropylcarbonate, tert-butyl peroxyacetate, tert-butyl peroxybenzoate, dicumyl peroxide, tert-butyl hydroperoxide, di-tert-butyl peroxide and the like.

The amount of polymerization initiator to be used for the polymerization of ethylene in the lower reaction zones of both said autoclave reactors is generally 5 to 500 parts by weight per 1,000,000 parts by weight of ethylene.

The polymerization initiators can be used either singly or in combination in such an amount as is commonly employed in both upper and lower reaction zones of the preceding and succeeding autoclave reactors.

Ethylene used as starting material in this invention may contain a chain transfer agent usually in an amount of 0.1 to 10 mol% based on the amount of ethylene fed.

Examples of such chain transfer agent usable in this invention are paraffins such as ethane, propane, butane, pentane, hexane and heptane; α-olefins such as propylene, butene-1, hexane-1 and 3-methylpentene-1; aldehydes such as formaldehyde, acetaldehyde and propionaldehyde; ketones such as acetone; methyl ethyl ketone, diethyl ketone and cyclohexanone; and aromatic hydrocarbons such as benzene, toluene and xylene; and these transfer agents may be used either singly or in combination.

The process of this invention is capable of producing polyethylene of high commercial value, excellent in both optical properties and processability, in a high yield and at a low cost, and hence such process is of extremely high economical and commerical significance.

The present invention is explained in more detail with reference to the following Examples and Comparative Examples, together with the accompanying drawings, but this invention is of course not limited thereto.

EXAMPLE 1

In FIG. 1, 88 kg/h of feed ethylene containing 1.5 mol% of ethane compressed to 1,300 kg/cm$^2$ was supplied through piping 12 and charged into the upper reaction zone 3 of the autoclave reactor 1 through pipings 13 and 14 at the rates of 22 kg/h and 44 kg/h, respectively, while the remaining 22 kg/h of feed ethylene was fed into the upper reaction zone 5 of another autoclave reactor 2 via piping 15.

Each of the autoclave reactors 1 and 2 was partitioned by baffles 7 and 8 into the upper reaction zones 3 and 5 and the lower reaction zones 4 and 6, respectively. The volume ratio of the upper to lower reaction zone was 1 in both of these reactors 1 and 2. Although not shown, each reactor was provided with a stirrer for stirring the a reaction mixture, and said baffle was mounted to this stirrer.

Also 33.4 g/h of octanoyl peroxide, a polymerization initiator, was supplied into the upper reaction zone 3 through piping 16 and 17, and ethylene was polymerized under reaction pressure of 1,300 kg/cm$^2$ and at temperature of 170° C.

The reaction mixture in the upper reaction zone 3 was introduced into the lower reaction zone 4 which was also supplied with 2.1 g/h of tert-butyl peroxide, a polymerization initiator, through piping 18, and then the mixture was subjected to polymerization at reaction temperature of 260° C. The thus polymerized reaction mixture was discharged from the bottom of the autoclave reactor 1 through a pressure regulating valve 9 into a heat exchanger 10 whereby said reaction mixture was cooled to 140° C. and then introduced into the lower reaction zone 6 of autoclave reactor 2.

In the upper reaction zone 5 of reactor 2, the feed ethylene supplied thereinto was charged with 6.8 g/h of octanoyl peroxide from piping 19 and polymerized under reaction pressure of 1,200 kg/cm$^2$ and at reaction temperature of 170° C., and this reaction mixture was introduced into the lower reaction zone 6 and mixed with the reaction mixture discharged from reactor 1 and introduced into said lower reaction zone 6 of the reactor 2 through said heat exchanger 10. Into this mixture, was charged 4.6 g/h of di-tert-butyl peroxide, a polymerization initiator, from piping 21, and then the mixture was subjected to polymerization at reaction temperature of 260° C.

The reaction mixture discharged from the lower reaction zone 6 was decompressed to the level of ordinary separation pressure by a pressure regulating valve 11 and then separated into formed polyethylene and unreacted ethylene.

Unreacted ethylene, after being compressed, was recirculated into the reaction system.

Polyethylene thus formed was 19.4 kg/h and the reaction yield of polyethylene was 22.1%. The density of the product, as measured according to ASTM D-1505, was 0.922 g/cm$^3$ and the melt index, as measured according to ASTM D-1238, was 2 g/10 min.

The haze and gloss of the polyethylene film, as measured according to ASTM D-1003 and ASTM D-523 and D-2103, were 2.8% and 130%, respectively.

The processability of this polyethylene into thin film was expressed by the minimum film thickness (unit $\mu$) which could be reached when the polyethylene was formed into film at resin temperature of 160° C., and said value was 13$\mu$.

EXAMPLES 2-9 AND COMPARATIVE EXAMPLES 1-2

Examples 2 to 9 and Comparative Examples 1 and 2 were conducted in the same manner as in Example 1. The results obtained are shown in the following table together with that of Example 1.

Comparative Example 1 is a comparison with Examples 1 and 2, and Comparative Example 2 is a comparison with Examples 3 and 4.

Superiority of this invention is evident from high reaction yield of polyethylene, and also from the facts that the smaller the haze value and the greater the gloss value are, the better the optical properties of the film are, and that the smaller the value of the thin film processability is, the better the processing characteristics of the film are.

Table

|  | Example 1 | Example 2 | Comparative Example 1 | Example 3 | Example 4 | Comparative Example 2 |
|---|---|---|---|---|---|---|
| Schematic diagram of reactor | FIG. 1 | FIG. 2 | FIG. 4 | FIG. 1 | FIG. 2 | FIG. 4 |
| Volume ratio of upper to lower reaction zone of reactor 1 | 1 | 1 | — | 1 | 1 | — |
| Volume ratio of upper to lower reaction zone of reactor 2 | 1 | 1 | — | 1 | 1 | — |
| Ethylene feed rate (kg/hr) |  |  |  |  |  |  |
| via piping 13 | 22 | 66 | 66 | 22 | 66 | 66 |
| via piping 14 | 44 | — | — | 44 | — | — |
| via piping 15 | 22 | 22 | 22 | 22 | 22 | 22 |
| Chain transfer agent    Type | Ethane | Ethane | Ethane | Propylene | Propylene | Propylene |
| Concentration (mol%) | 1.5 | 1.3 | 2.9 | 1.0 | 0.9 | 2.1 |
| Reaction pressure (kg/cm$^2$) |  |  |  |  |  |  |
| Reactor 1 | 1300 | 1300 | 1300 | 2400 | 2400 | 2400 |
| Reactor 2 | 1200 | 1200 | 1200 | 2200 | 2200 | 2200 |
| Reaction temperature (° C) |  |  |  |  |  |  |
| Upper reaction zone/lower reaction zone of reactor 1 | 170/260 | 170/260 | Reactor 1 170 | 170/250 | 170/250 | Reactor 1 170 |
| Upper reaction zone/lower reaction zone of reactor 2 | 170/260 | 170/260 | Reactor 2 260 | 170/250 | 170/250 | Reactor 2 250 |
| Outlet temperature of heat exchanger 10 (° C) | 140 | 140 | 140 | 150 | 150 | 150 |
| Polyermization initiator feed rate (g/hr) |  |  |  |  |  |  |
| via pipings 16, 17 | A 33.4 | A 37.2 | A 18.5 | C 7.3 | C 8.2 | C 4.3 |
| via piping 18 | B 2.1 | B 2.0 | — | D 0.5 | D 0.4 | — |
| via pipings 19, 20 | A 6.8 | A 7.0 | — | C 1.5 | C 1.4 | — |
| via piping 21 | B 4.6 | B 4.6 | B 3.1 | D 0.4 | D 0.3 | D 0.3 |
| Reaction yield of polyethylene (%) | 22.1 | 22.0 | 17.5 | 20.2 | 20.4 | 16.3 |
| Density (g/cm$^3$) | 0.922 | 0.922 | 0.922 | 0.925 | 0.925 | 0.925 |
| Melt index (g/10 min) | 2 | 2 | 2 | 2 | 2 | 2 |
| Optical properties Haze (%) | 2.8 | 3.4 | 5.2 | 3.8 | 4.3 | 6.4 |
| Gloss (%) | 130 | 120 | 100 | 110 | 100 | 90 |
| Thin film processability ($\mu$) | 13 | 13 | 18 | 10 | 11 | 14 |

|  | Example 5 | Example 6 | Example 7 | Example 8 | Example 9 |
|---|---|---|---|---|---|
| Schematic diagram of reactor | FIG. 1 | FIG. 1 | FIG. 1 | FIG. 2 | FIG. 3 |
| Volume ratio of upper to lower reaction zone of reactor 1 | 2 | 4 | 2 | 2 | 2 |
| Volume ratio of upper to lower reaction zone of reactor 2 | 1 | 1 | 2 | 1 | 4 |
| Ethylene feed rate (kg/hr) |  |  |  |  |  |
| via piping 13 | 33 | 22 | 22 | 66 | 22 |
| via piping 14 | 44 | 44 | 44 | — | 44 |
| via piping 15 | 11 | 22 | 22 | 22 | 22 |
| Chain transfer agent    Type | Propane | Propylene | Ethane | Propylene | Ethane |
| Concentration (mol%) | 2.2 | 2.5 | 7.7 | 0.5 | 2.0 |
| Reaction pressure (kg/cm$^2$) |  |  |  |  |  |
| Reactor 1 | 1200 | 1500 | 1400 | 2000 | 1300 |
| Reactor 2 | 1100 | 1400 | 1200 | 1800 | 1200 |
| Reaction temperature (° C) |  |  |  |  |  |
| Upper reaction zone/lower reaction zone of reactor 1 | 160/250 | 170/265 | 165/240 | 160/250 | 170/260 |
| Upper reaction zone/lower reaction zone of reactor 2 | 160/260 | 165/260 | 170/250 | 165/265 | 170/260 |
| Outlet temperature of heat exchanger 10 (° C) | 140 | 145 | 140 | 155 | 140 |
| Polymerization initiator feed rate (g/hr) |  |  |  |  |  |
| via pipings 16, 17 | A 32.3 | A 13.5 | A 18.7 | C 8.8 | C 25.1 |
| via piping 18 | D 4.1 | B 1.9 | D 1.9 | D 0.8 | B 3.0 |
| via pipings 19, 20 | A 8.7 | A 4.3 | A 4.0 | C 2.6 | C 17.0 |
| via piping 21 | B 5.9 | B 3.0 | D 4.3 | B 0.5 | B 11.5 |
| Reaction yield of polyethylene (%) | 22.5 | 22.0 | 20.2 | 21.4 | 22.0 |
| Density (g/cm$^3$) | 0.922 | 0.922 | 0.924 | 0.924 | 0.922 |
| Melt index (g/10 min) | 2 | 2 | 2 | 2 | 2 |
| Optical properties Haze (%) | 2.3 | 5.5 | 3.8 | 4.1 | 3.7 |
| Gloss (%) | 130 | 100 | 110 | 100 | 110 |

| Table-continued | | | | | |
|---|---|---|---|---|---|
| Thin film processability (μ) | 12 | 13 | 13 | 11 | 14 |

(Notes)
A: octanoyl peroxide,
B: di-tert-butyl peroxide,
C: 3,5,5-trimethylhexanoyl peroxide,
D: tert-butyl peroxybenzoate

What is claimed is:

1. In a process for polymerizing ethylene under high temperature and high pressure conditions by using a battery of two or more autoclave reactors connected in series by piping provided with a heat exchanger, in which the reaction mixture withdrawn from the autoclave reactor of the preceding stage is cooled by said heat exchanger and the cooled reaction mixture is further introduced into the succeeding autoclave reactor, the improvement which comprises supplying a substantial portion of feed ethylene into the upper reaction zone of the preceding autoclave reactor having an upper reaction zone and a lower reaction zone, while supplying the remaining portion of said feed ethylene into the upper reaction zone of the succeeding autoclave reactor having an upper reaction zone and a lower reaction zone, polymerizing the ethylene in the upper reaction zone of said preceding autoclave reactor under a pressure of 1,000 to 2,800 kg/cm$^2$ and at a temperature of 130° to 200° C. in the presence of a polymerization initiator, introducing the thus obtained reaction mixture into the upper or lower reaction zone of said preceding autoclave reactor and polymerizing said mixture therein at a temperature of 220° to 280° C. in the presence of a polymerization initiator, cooling the reaction mixture withdrawn from the bottom end of said preceeding reactor to a temperature higher than 120° C. but lower than the reaction temperature in the lower reaction zone of said preceding reactor by 20° C. or more by the heat exchanger provided between said preceding and succeeding reactors, then forwarding the cooled reaction mixture into the upper reaction zone of said succeeding reactor and polymerizing said mixture therein under a pressure of 1,000 to 2,800 kg/cm$^2$ and at a temperature of 130° to 200° C. in the presence of a polymerization initiator, introducing the thus obtained reaction mixture into the lower reaction zone of said succeeding reactor and further polymerizing said mixture therein at a temperature of 220° to 280° C. in the presence of a polymerization initiator.

2. A process according to claim 1, wherein a battery of two autoclave reactors connected in series by piping provided with a heat exchanger is used.

3. A process according to claim 1, wherein the volume ratio of the upper or lower reaction zone of either of said preceding and succeeding reactors is 1 to 6.

4. A process according to claim 1, wherein the inlets of the feed ethylene and those of the polymerization initiator into the upper reaction zone of the preceding reactor provided are two or more each in number along the length of the reactor.

5. A process according to claim 4, wherein the inlets of the feed ethylene and those of the polymerization initiator into the upper reaction zone of the preceding reactor provided are each in number along the length of the reactor.

6. A process according to claim 1, wherein the feed ethylene contains a chain transfer agent in an amount of 0.1 to 10 mol% based on the amount of said ethylene.

7. A process according to claim 1, wherein the quantities of the polymerization initiator to be used in the upper and lower reaction zones are 50 to 1,000 parts and 5 to 500 parts per 1,000,000 parts, by weight, of ethylene, respectively.

* * * * *